Nov. 7, 1950
G. PETERSON ET AL
2,528,543
RADIO BEACON SYSTEM
Filed Sept. 6, 1944
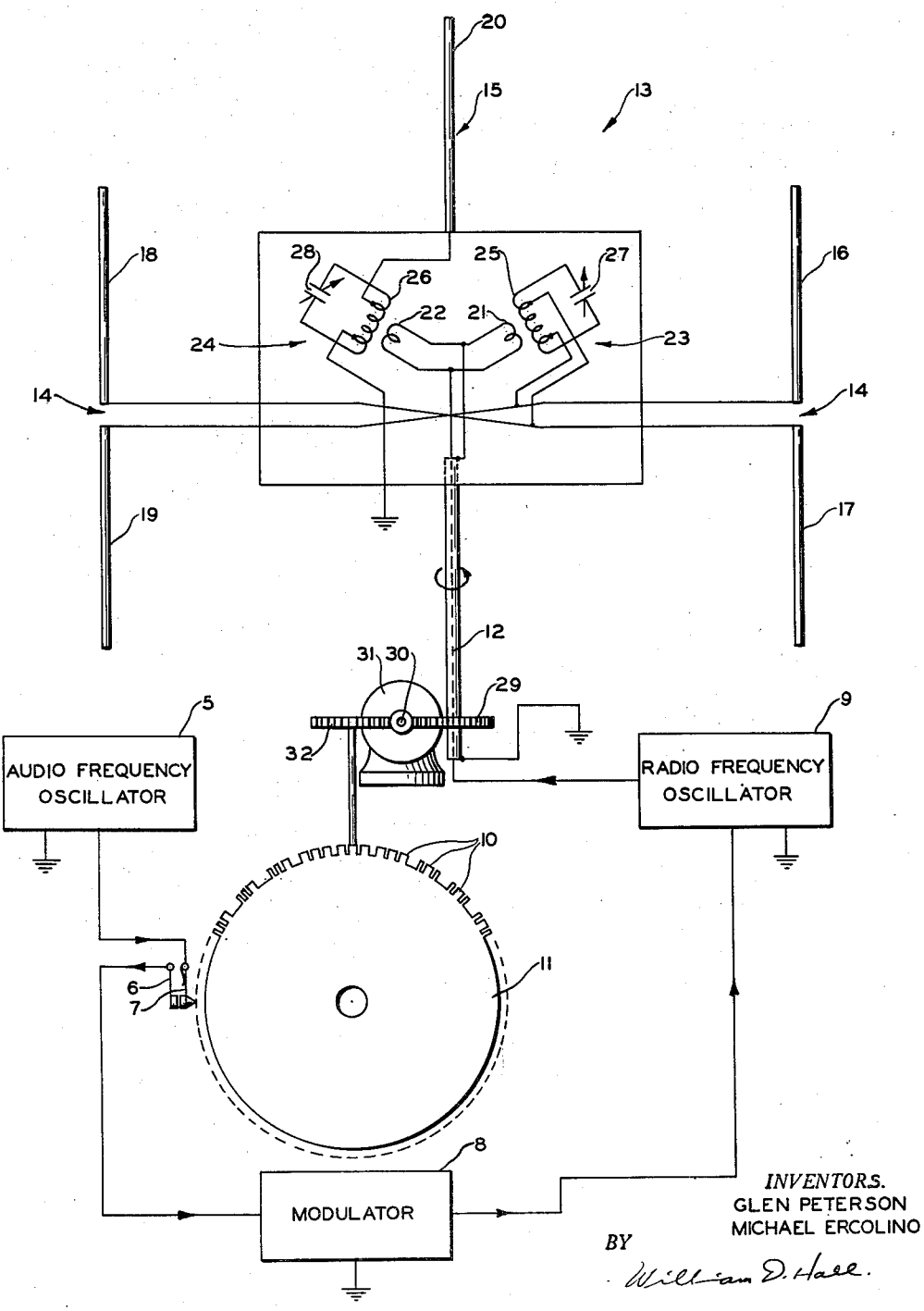
INVENTORS.
GLEN PETERSON
MICHAEL ERCOLINO
BY
William D. Hall.
ATTORNEY Patented Nov. 7, 1950

2,528,543

UNITED STATES PATENT OFFICE 2,528,543

RADIO BEACON SYSTEM

Glen Peterson and Michael Ercolino, Asbury Park, N. J., assignors to the United States of America as represented by the Secretary of War Application September 6, 1944, Serial No. 552,862

4 Claims. (Cl. 343—106)

(Granted under the act of March 3, 1883, as amended April 30, 1928; 370 O. G. 757)

The invention described herein may be manufactured and used by or for the Government for governmental purposes, without the payment to us of any royalty thereon.

Our present invention relates to radio beacon systems, and more particularly, to that type of beacon system wherein a continuously rotating, highly directional beam is utilized to transmit a series of distinctive signals, each of said signals identifying a predetermined instantaneous direction of said beam, and said series of signals repeating with each revolution of said beam.

The location of a receiver at a point remote from such a beacon may be determined by noting which signal is received with the greatest intensity. Now, if the beacon is amplitude-modulated, no difficulty is encountered; but, if it is desired to apply frequency-modulation to such a system, the limiting action of an FM receiver causes all received signals to be of substantially equal intensity; no maximum can be detected, and the system becomes inoperative.

However, because of the many well known advantages of frequency-modulation, it is desirable that this type of transmission be utilized in a beacon system; and it is primarily to the solution of the problem above posed that our present invention is addressed.

Of course, a frequency-modulated beacon having the characteristics described in the opening paragraph of this specification will function satisfactorily, more or less, if the usual limiter is omitted from the FM receiver, or said receiver is provided with a switch for cutting out the limiter when it is desired to take a bearing. But, this would destroy one of the important advantages of frequency-modulation, namely, the elimination of noise - producing amplitude changes in the radio-frequency carrier, and so, these expedients are no answers to the problem.

We have found that by frequency-modulating the carrier with distinctive code signals, and employing a rotating cardioid radiation pattern, the null of said pattern being initially aligned with a reference direction, a standard FM receiver may be utilized to obtain a bearing and permit homing on the beacon. In such a system, all of the signals transmitted are received with substantially equal intensity, except that those signals which are transmitted while the cardioid null is facing the receiver, will either not be received at all, or will be received with greatly reduced intensity. In either event, these last-named signals will be readily identifiable.

While the foregoing discussion is concerned primarily with frequency-modulated systems, it is to be borne in mind that the principles of our present invention are equally applicable to amplitude-modulated systems.

It is, therefore, one of the objects of our present invention to provide a frequency-modulated radio beacon which can be utilized with a standard FM receiver to obtain a bearing of the receiver with respect to the beacon, and thereby enable homing on said beacon.

It is another object of our present invention to provide a compact, portable adaptor unit for speedily transforming a conventional radio transmitter, of either the amplitude-modulated or frequency-modulated type, into a radio beacon.

We have also found that most beacon antenna arrays, unless of fixed frequency, are very difficult to phase, so that technically trained personnel are required to perform this operation.

It is, therefore, a further object of our present invention to provide a simple, fool-proof means of phasing the several elements of the beacon antenna, relative to each other, in such a way as to provide the desired polar pattern over a considerable frequency range.

Finally, it is an object of our present invention generally to improve the art of radio beacons by providing a system which is simple in construction, easy and economical to fabricate and assemble, and admirably adapted to perform its intended functions.

These, and other objects and advantages of our present invention, which will be better understood as the detailed description thereof progresses, are attained in the following manner:

We provide a wheel having its periphery cut to present a series of projections corresponding, for example, to International Morse code characters. This wheel is utilized to control the application of the output of an audio-frequency oscillator to a standard transmitter, preferably of the FM type, whereby the output of the latter becomes modulated with said code characters.

The output of the transmitter is fed to a radiating system, preferably comprising an Adcock antenna and a vertical antenna, the system being so phased that the resulting radiation takes the form of a cardioid with a well defined null.

The radiating system is initially oriented so that the null of the cardioid points in a reference direction, and, in operation, the system is rotated about an axis coincident with the vertical antenna thereof. Said rotation is synchronized with rotation of the code wheel whereby each transmitted signal corresponds to the direction in which the null of the cardioid is instantaneously pointing.

At a location remote from the beacon a receiver, preferably an FM receiver, detects all of the transmitted signals except those radiated while the null of the cardioid is facing in the direction of the receiver; or, if the null is not perfect, the last-named signals will be received with greatly reduced intensity. It is preferable that the receiver be provided with a squelch circuit, although this is not essential.

Now, provided the operator of the receiver is familiar with the code and the directions indicated thereby, the missing signal or signals inform him of his direction with respect to the beacon, thereby enabling him to home thereon.

In the accompanying specification there is described, and in the annexed drawing shown, an illustrative embodiment of the radio beacon of our present invention. It is, however, to be clearly understood that our present invention is not limited to said embodiment, inasmuch as changes therein may be made without the exercise of invention and within the true spirit and scope of the claims hereto appended.

In said drawing, the single figure is a partially schematic, partially block diagram of a beacon system assembled in accordance with the principles of our present invention.

Referring now more in detail to the aforesaid illustrative embodiment of our present invention with particular reference to the drawing showing the same, the numeral 5 designates any desired audio-frequency oscillator for generating electrical oscillations, preferably, of about 1,000 cps. The output of said oscillator is applied, through a pair of normally disengaged switch contacts 6 and 7, to a suitable modulator 8; and the output of the latter is, in turn, applied to a radio-frequency oscillator 9.

Closing of the switch contacts 6 and 7 is controlled by the camming action of projections 10 cut into the periphery of a wheel 11. While not limited thereto, the projections preferably define eight International Morse code characters each of which is repeated three times in succession. Each character represents, as will hereinafter be more fully described, a 15° sector of space symmetrically disposed about a predetermined compass point.

The code-modulated output of the R. F. oscillator 9 is conveyed, through a coaxial cable 12, to a radiating system 13, said system including an elevated H-type Adcock antenna 14 and a vertical antenna 15. The Adcock antenna may comprise four radiating elements 16 to 19 inclusive, and the vertical antenna may comprise a single radiating element 20.

The cable 12 feeds a pair of parallel inductors 21 and 22 which, in turn, are coupled, respectively, to tuned circuits 23 and 24. The latter comprise inductors 25 and 26, respectively shunted by variable capacitors 27 and 28.

The tuned circuit 23 is tapped to feed the Adcock antenna 14, and the tuned circuit 24 is tapped to feed the vertical antenna 15. If desired, the mast for supporting the array may be utilized as a counterpoise for the antenna 15. The connections between the elements 16 to 19 inclusive of the Adcock antenna are such that the elements 16 and 19 are paired so as to be excited in phase, and the same applies to the elements 17 and 18, the paired elements being, therefore, 180° out-of-phase.

The entire radiating system 13 is mounted, in any appropriate manner, for rotation about an axis coincident with the centrally disposed vertical antenna 15. For example, the coaxial cable may carry a worm wheel 29 adapted to be driven by a worm gear 30 mounted upon the shaft of a motor 31, said motor also driving another worm wheel 32 which, through appropriate driving mechanism (not shown), causes rotation of the code wheel 11 in synchronism with the rotation of the radiating system.

This completes the description of the aforesaid illustrative embodiment of our present invention, and the operation thereof may be briefly summarized as follows:

Assuming that the output circuit of the R. F. oscillator 9 has been properly tuned to resonance, and that the plane of the radiating system 13 has been aligned with a reference direction, for example, north-south, circuits 23 and 24 are tuned to resonance by adjusting the variable capacitors 27 and 28 respectively, the two circuits interacting with each other through their mutually coupled antennae. This tuning of the antenna system to obtain the desired pattern is readily accomplished by locating a suitable radiation indicator one or more wave lengths away from the beacon in the plane of the beacon antenna array. If the radiation indicator is located on what is intended to be the radiation side of the beacon antenna array, the variable capacitors 27 and 28 are alternately tuned to cause a maximum radiation indication; whereas, if the radiation indicator is located on what is intended to be the null side of the antenna array, the variable capacitors 27 and 28 are tuned to cause a minimum radiation. This is brought about by the above-described disposition of the tuned circuits 23 and 24, and the fact that the elements of the array, when disposed as described, react upon each other to produce maximum and minimum radiations in the opposite directions of the plane of the antenna system. The beacon is now ready for use.

The radiating system 13 is continuously rotated in synchronism with the rotation of the code wheel 11 so that the signal transmitted at any given instant is indicative of the direction in which the cardioid null is pointing at that instant.

As previously stated, a receiver, located at a remote point, will detect all of the signals transmitted during the rotation of the antenna system 13 except those radiated while the null of the cardioid is pointing toward the receiver. Assuming that the operator of the receiver is familiar with the code and the directions represented thereby, he becomes informed of his direction with respect to the beacon as soon as he identifies the missing transmitted characters.

This completes the description of the mode of operation of our present invention. It will be noted that we have provided a beacon system which readily lends itself to use with frequency modulation, and which permits the use of standard FM transmitters and receivers, thereby solving the problems discussed in the earlier portions of this specification.

It will further be noted that the device is simple and compact, is readily transported, and is speedily erected for operation.

Other objects and advantages of our present invention will readily occur to those skilled in the art to which the same relates.

We claim:

1. In a radio beacon system: a radio-frequency generator; an audio-frequency generator; a normally open switch connected between said generators; a code wheel for intermittently closing said switch in such manner that the output of said radio-frequency generator becomes tone-modulated in accordance with a predetermined code the individual characters of which represent predetermined directions with respect to the beacon; an antenna system for directionally radiating the modulated output of said radio-frequency generator over a cardioid polar pattern; means for rotating said antenna system; and means for synchronizing the rotation of said antenna system with the operation of said code wheel whereby each radiated character indicates the instantaneous direction of the null of said cardioid pattern.

2. In a radio beacon system: a radio-frequency generator; an audio-frequency generator; a normally open switch connected between said generators; a code wheel for intermittently closing said switch in such manner that the output of said radio-frequency generator becomes tone-modulated in accordance with a predetermined code the individual characters of which represent predetermined directions with respect to the beacon; an antenna system for directionally radiating the modulated output of said radio-frequency generator over a cardioid polar pattern; said antenna system including an Adcock antenna, a vertical antenna, and means for adjusting the phase relationship therebetween so that the null of said cardioid pattern initially points in a selected reference direction; means for rotating said antenna system; and means for synchronizing the rotation of said antenna system with the operation of said code wheel whereby each radiated character indicates the instantaneous direction of the null of said cardioid pattern.

3. A radio beacon system in accordance with claim 1, wherein the radio-frequency generator is frequency-modulated by said audio frequency generator.

4. A radio beacon system in accordance with claim 2, wherein the radio-frequency generator is frequency-modulated by said audio-frequency generator.

GLEN PETERSON.
MICHAEL ERCOLINO.

REFERENCES CITED

The following references are of record in the file of this patent:

UNITED STATES PATENTS

| Number | Name | Date |
| --- | --- | --- |
| 833,034 | DeForest | Oct. 9, 1906 |
| 1,732,741 | Conrad | Oct. 22, 1929 |
| 2,014,732 | Hansell | Sept. 17, 1935 |
| 2,377,902 | Relson | June 12, 1945 |
| 2,420,605 | McConnel | May 13, 1947 |